July 18, 1944.  M. CAVICCHIOLI  2,353,993
WASTE AND GREASE TRAP
Filed April 26, 1943   2 Sheets-Sheet 1
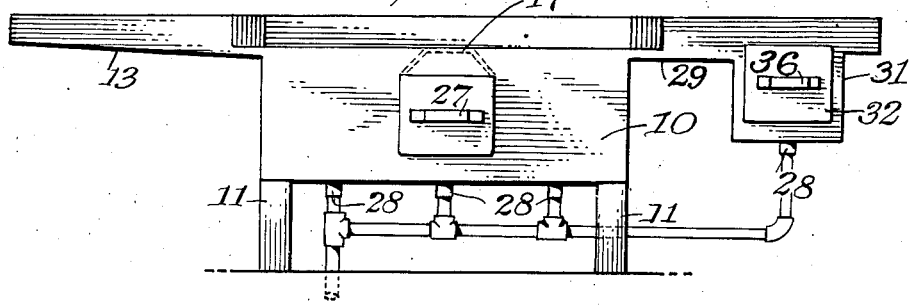
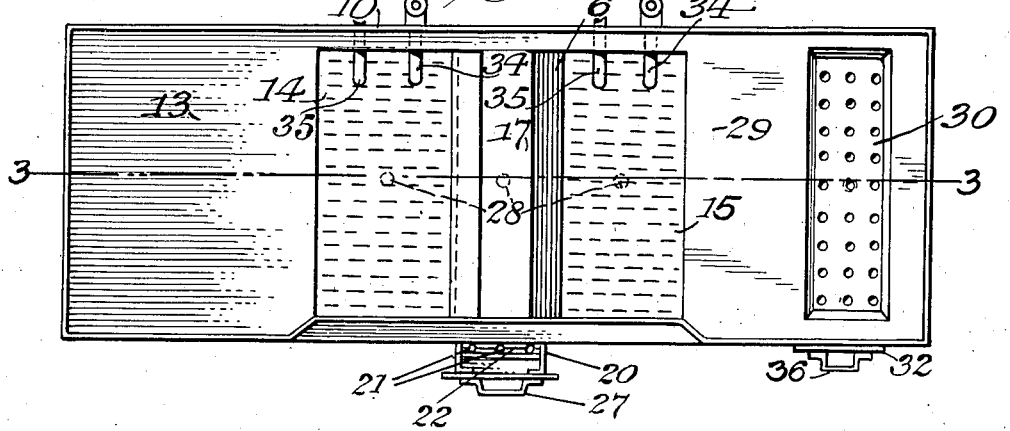
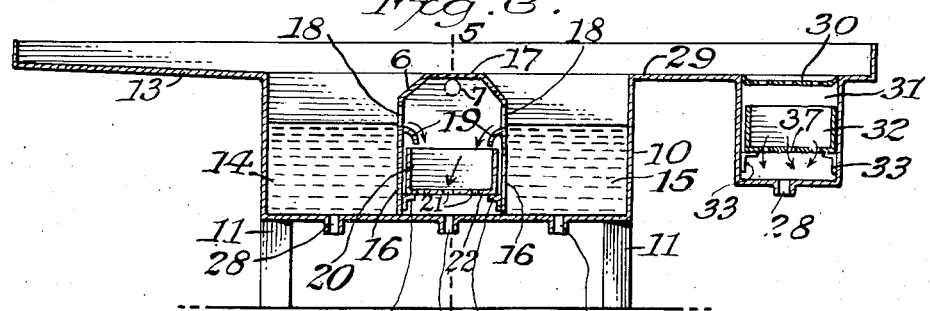
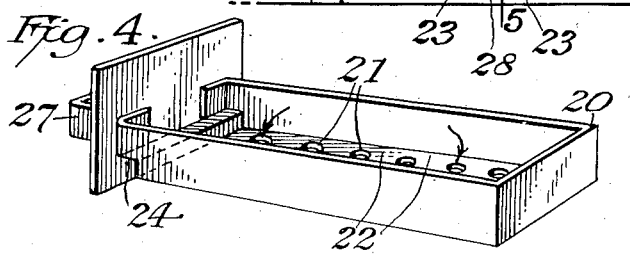
Mario Cavicchioli
INVENTOR.
BY Edward T. Kruglak July 18, 1944.　　　M. CAVICCHIOLI　　　2,353,993
WASTE AND GREASE TRAP
Filed April 26, 1943　　　2 Sheets-Sheet 2

Mario Cavicchioli
INVENTOR.
BY Edward T. Kruglak

Patented July 18, 1944

2,353,993

UNITED STATES PATENT OFFICE 2,353,993

WASTE AND GREASE TRAP

Mario Cavicchioli, New York, N. Y.

Application April 26, 1943, Serial No. 484,594

2 Claims. (Cl. 4—187)

This invention relates to a novel and improved trap to be used in combination with a sink, a dishwasher, a sterilizer or plumbing fixtures or the like, for the treatment of waste waters for the removal of grease, oil, sediment, refuse and other waste material which is arrested and captured as said waste waters flow to the waste line of a plumbing system.

An object of this invention is to provide more specifically an automatically locking drawer trap and grease collector.

Another object of this invention is to provide a unique construction whereby said drawer trap may be interlocked with the front wall of a housing by gravity, and unlocked therefrom by lifting the forward end of the drawer trap for removal from said housing.

Another object of this invention is to prevent water spillage, which would occur if the drawer trap were to be accidentally withdrawn before the water supply source were shut, and the water in the drawer-trap permitted to drain out, by requiring a positive unlocking motion before the drawer-trap could be removed.

The invention is not limited to any particular physical embodiment, but on the contrary is susceptible of being expressed in different structures and forms and certain of its features may be employed to the exclusion of others in view of the appended claims.

In the drawings forming part of this specification and in which like characters of reference represent corresponding parts throughout the several views:

Fig. 1 is a front elevation of a sink in which are embodied drawer traps for the collection of grease, oil, sediment, refuse and other waste material from waters passing to discharge openings, in accordance with the principles of my invention.

Fig. 2 is a plan view of the structure disclosed in Fig. 1, and shows one of the important drawer traps partially withdrawn from the trap housing to expose outlet openings in the bottom of the drawer.

Fig. 3 is a longitudinal vertical section of the structure taken on line 3—3 of Figure 2.

Figure 4 is a prospective view of the improved drawer trap removed from its supports in the housing.

Figure 5:
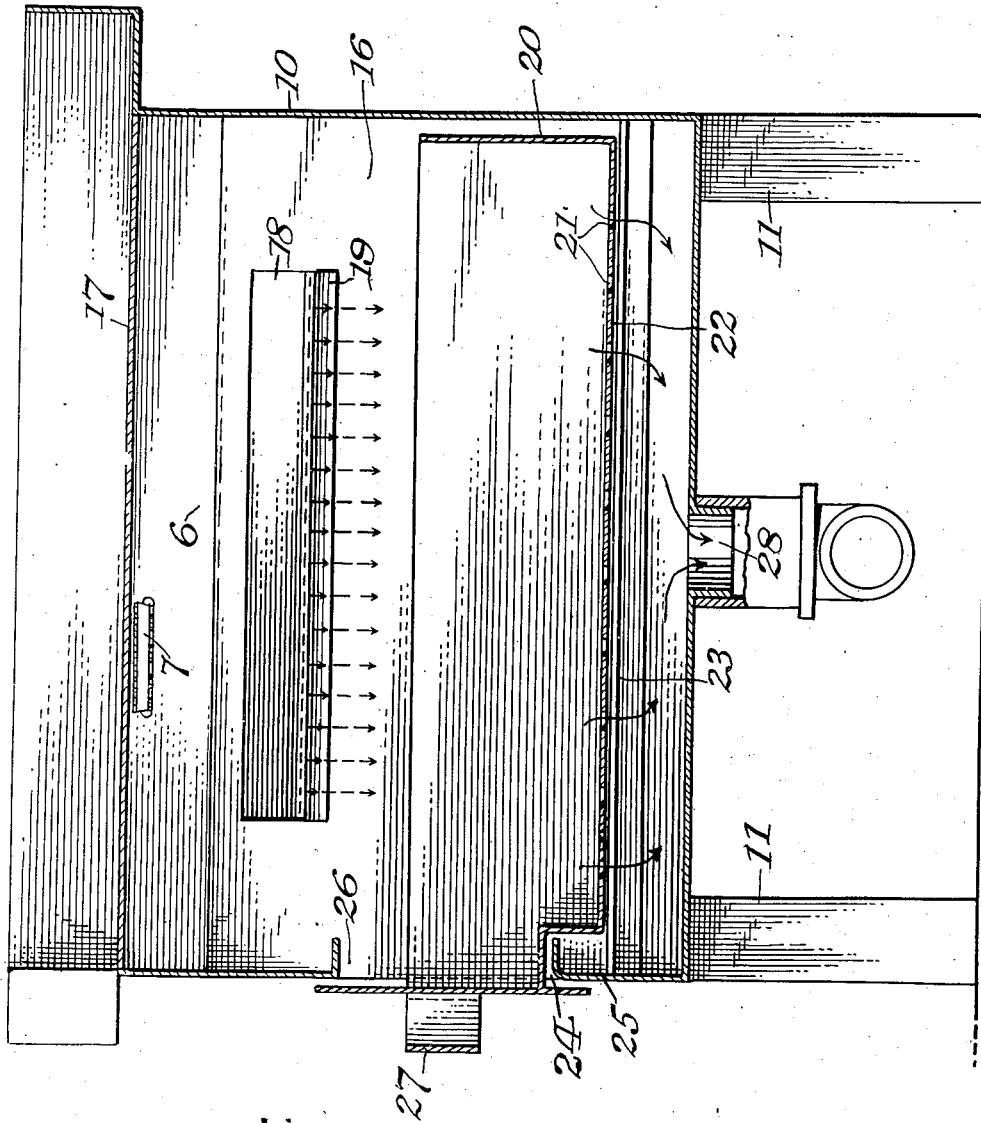
Figure 5 is a cross section taken on line 5—5 of Fig. 3.

Referring to the drawings, one form of my improvement is shown embodied in sink 10, supported on legs 11. Tank 14 and tank 15 are separated by a housing 6 comprising side walls 16 and bridge plate 17. Overflow slots or openings 18 are provided in the spaced side walls 16. Said slots or openings are formed integrally at the lower edges with inwardly and downwardly curved tongues 19 over which the overflow water from tanks 14 and 15, augmented by grease, oil, refuse and other waste material passes and falls into the centrally placed drawer trap 20. Said trap retains the grease, etc., but permits the liquid to seep out through perforations 21 into the drain outlet 28.

Platform 13 is used for draining washed articles, and any grease or refuse remaining is carried by its sloping surface to tank 14.

Platform 29 receives unwashed articles. The grease, oil, refuse and other waste material passes through the countersunk perforations 30 into the housing 31 below, and into the drawer trap 32 disposed on guides 33. The liquid seeps out through perforations 37 and into the drain outlet 28. The said drawer trap is slidably removable by means of handle 36. Trap 32 is identical with drawer trap 20 and contains the identical locking feature and construction, as follows:

Drawer trap 20 has perforations 21 in bottom 22. It is supported on side ledges 23 in housing 6, and is slidably removable therefrom. The front end of drawer trap 20 is formed with a gravity catch crimp 24 which interlocks with flange 25 of the sink 10 proper. Opening 26 in the sink's front wall is made larger than the drawer's depth to permit its raising by handle 27 over flange 25 when it is desired to withdraw it from the housing 6 for cleansing purposes. The housing 6 may be cleaned inside if desired by a perforated pipe 7 extending the length of the housing, and connected to the water supply. All liquid containers are provided with outlet means 28 for making connection with plumbing waste lines. The tanks 14 and 15 may be fed with hot and cold water from faucets 34 and 35 for washing and rinsing as required.

What I desire to secure by Letters Patent of the United States is:

1. In combination with a receptacle, a grease and refuse trap having inlet means, a housing including spaced sidewalls, a rear wall, a bottom having a drain outlet, a front wall having a cleanout opening the lower edge of which terminates in a flange extending horizontally inwardly, a removable drawer-trap slidably mounted in said housing, said drawer-trap including spaced side walls, a front wall larger than said cleanout opening to overlie the outside edges of said cleanout opening when said drawer-trap is in a closed position, a rear wall and a perforated bottom having a crimp rising perpendicularly from said bottom and extending horizontally to the said front wall, the horizontal portion of said crimp resting upon said flange when said drawer-trap is in a closed position, the vertical portion of said crimp engaging the longitudinal edge of said flange and co-acting with the front wall which engages the outside edges of said cleanout opening to lock said drawer-trap in place.

2. In a sink, spaced vertical partition walls having spillway openings dividing said sink into compartments, the bottoms of said compartments having drain outlets, the front wall of said sink having spaced between said partition walls a cleanout opening the lower edge of which terminates in a flange extending horizontally inwardly, in combination with a removable drawer-trap slidably mounted between said partition walls said drawer-trap including spaced side walls, a front wall larger than said cleanout opening to overlie the outside edges of said cleanout opening when said drawer-trap is in a closed position, a rear wall and a perforated bottom having a crimp rising perpendicularly from said bottom and extending horizontally to the said front wall, the horizontal portion of said crimp resting upon said flange when said drawer-trap is in a closed position, the vertical portion of said crimp engaging the longitudinal edge of said flange and co-acting with the front wall which engages the outside edges of said cleanout opening to lock said drawer-trap in place.

MARIO CAVICCHIOLI.